United States Patent
Gardner

(10) Patent No.: US 10,506,270 B2
(45) Date of Patent: *Dec. 10, 2019

(54) METHOD AND APPARATUS FOR TRANSMITTING MEDIA CONTENT

(71) Applicant: AT&T Intellectual Property I, L.P., Atlanta, GA (US)

(72) Inventor: James Gardner, Middletown, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/865,310

(22) Filed: Jan. 9, 2018

(65) Prior Publication Data

US 2018/0131984 A1     May 10, 2018

Related U.S. Application Data

(63) Continuation of application No. 14/511,959, filed on Oct. 10, 2014, now Pat. No. 9,900,643.

(51) Int. Cl.
*H04N 7/173* (2011.01)
*H04N 21/2662* (2011.01)
(Continued)

(52) U.S. Cl.
CPC ..... *H04N 21/2662* (2013.01); *H04L 65/4084* (2013.01); *H04L 65/605* (2013.01);
(Continued)

(58) Field of Classification Search
CPC . H04L 1/0009; H04L 47/127; H04L 65/4084; H04N 21/234345;
(Continued)

(56) References Cited

U.S. PATENT DOCUMENTS 5,832,000 A    11/1998   Lin et al.
6,192,472 B1    2/2001   Garay et al.
(Continued)

OTHER PUBLICATIONS

Koh, Chin C., "Building and Monitoring Next-Generation Video Transport Infrastructures", SET—Revista de Radiodifusão, Jun. 6, 2014.

*Primary Examiner* — Jason P Salce
(74) *Attorney, Agent, or Firm* — Guntin & Gust, PLC; Douglas Schnabel

(57) ABSTRACT

Aspects of the subject disclosure may include, for example, a method for providing redundancy in a video data stream. For every data frame of a plurality of data frames of video content, the method includes dividing the data frame into a plurality of data segments and copying a plurality of each of the plurality of data segments to the plurality of data frames in a data stream to provide redundancy for the data frame within the plurality of data frames in the data stream. The plurality of each of the plurality of data segments is distributed across the plurality of data frames to provide generate a plurality of redundancy-enhanced data frames that provide the redundancy over a protection interval associated with a network path. The method includes transmitting a data stream comprising the plurality of redundancy-enhanced data frames to a receiver via the network path. Other embodiments are disclosed.

19 Claims, 9 Drawing Sheets

(51) Int. Cl.
- *H04N 21/2343* (2011.01)
- *H04N 21/24* (2011.01)
- *H04N 21/643* (2011.01)
- *H04N 21/438* (2011.01)
- *H04N 21/647* (2011.01)
- *H04N 21/6338* (2011.01)
- *H04N 21/845* (2011.01)
- *H04L 29/06* (2006.01)

(52) U.S. Cl.
CPC ... *H04L 65/607* (2013.01); *H04N 21/234345* (2013.01); *H04N 21/2402* (2013.01); *H04N 21/438* (2013.01); *H04N 21/6338* (2013.01); *H04N 21/6473* (2013.01); *H04N 21/64322* (2013.01); *H04N 21/64738* (2013.01); *H04N 21/8458* (2013.01)

(58) Field of Classification Search
CPC .......... H04N 21/2402; H04N 21/2662; H04N 21/438; H04N 21/6338; H04N 21/64322; H04N 21/6473; H04N 21/64738; H04N 21/8458
See application file for complete search history.

(56) References Cited

U.S. PATENT DOCUMENTS

| | | |
|---|---|---|
| 6,374,336 B1 | 4/2002 | Peters et al. |
| 7,299,486 B1 | 11/2007 | Campbell et al. |
| 8,265,154 B2 | 9/2012 | Gardner |
| 8,306,060 B2 | 11/2012 | Ngo et al. |
| 8,355,437 B2 | 1/2013 | Hannuksela |
| 8,442,115 B2 | 5/2013 | Gardner |
| 8,665,953 B2 | 3/2014 | Gardner |
| 8,667,374 B2 | 3/2014 | Watford et al. |
| 8,705,631 B2 | 4/2014 | Shepherd et al. |
| 2003/0200326 A1 | 10/2003 | Leighton et al. |
| 2004/0090966 A1* | 5/2004 | Thomas .............. H04L 67/1008 370/395.52 |
| 2005/0229038 A1 | 10/2005 | Jinzaki et al. |
| 2007/0189383 A1 | 8/2007 | Shao et al. |
| 2008/0024389 A1 | 1/2008 | O'Brien-Strain et al. |
| 2008/0147821 A1* | 6/2008 | Dietrich ............ G06F 17/30206 709/216 |
| 2009/0063935 A1 | 3/2009 | Singh et al. |
| 2010/0003015 A1 | 1/2010 | Rodriguez et al. |
| 2011/0002377 A1 | 1/2011 | Raveendran |
| 2012/0192031 A1 | 7/2012 | Liu et al. |
| 2013/0114448 A1 | 5/2013 | Koo |
| 2013/0235934 A1 | 9/2013 | Gardner |
| 2014/0226730 A1 | 8/2014 | Rodriguez et al. |

* cited by examiner

100

200

300

400

METHOD AND APPARATUS FOR TRANSMITTING MEDIA CONTENT

CROSS-REFERENCE TO RELATED APPLICATIONS

This application is a continuation of and claims priority to U.S. patent application Ser. No. 14/511,959, filed Oct. 10, 2014. The contents of the foregoing is hereby incorporated by reference into this application as if set forth herein in full.

FIELD OF THE DISCLOSURE

The subject disclosure relates to a method and apparatus for transmitting media content.

BACKGROUND

Media content is typically experienced by consumers via devices such as computers, televisions, radios, and mobile electronics. Media content is delivered by service providers, who send the content, such as television, radio, and video programming, to consumers for enjoyment at their physical locations. Modern communications networks benefit from interconnectivity between consumers and various communication devices. As network capabilities expand, these interconnections provide new opportunities to enhance the ability for consumers to enjoy media content by experiencing a variety of content over multiple devices.

BRIEF DESCRIPTION OF THE DRAWINGS

Reference will now be made to the accompanying drawings, which are not necessarily drawn to scale, and wherein.

DETAILED DESCRIPTION

Figure 1:
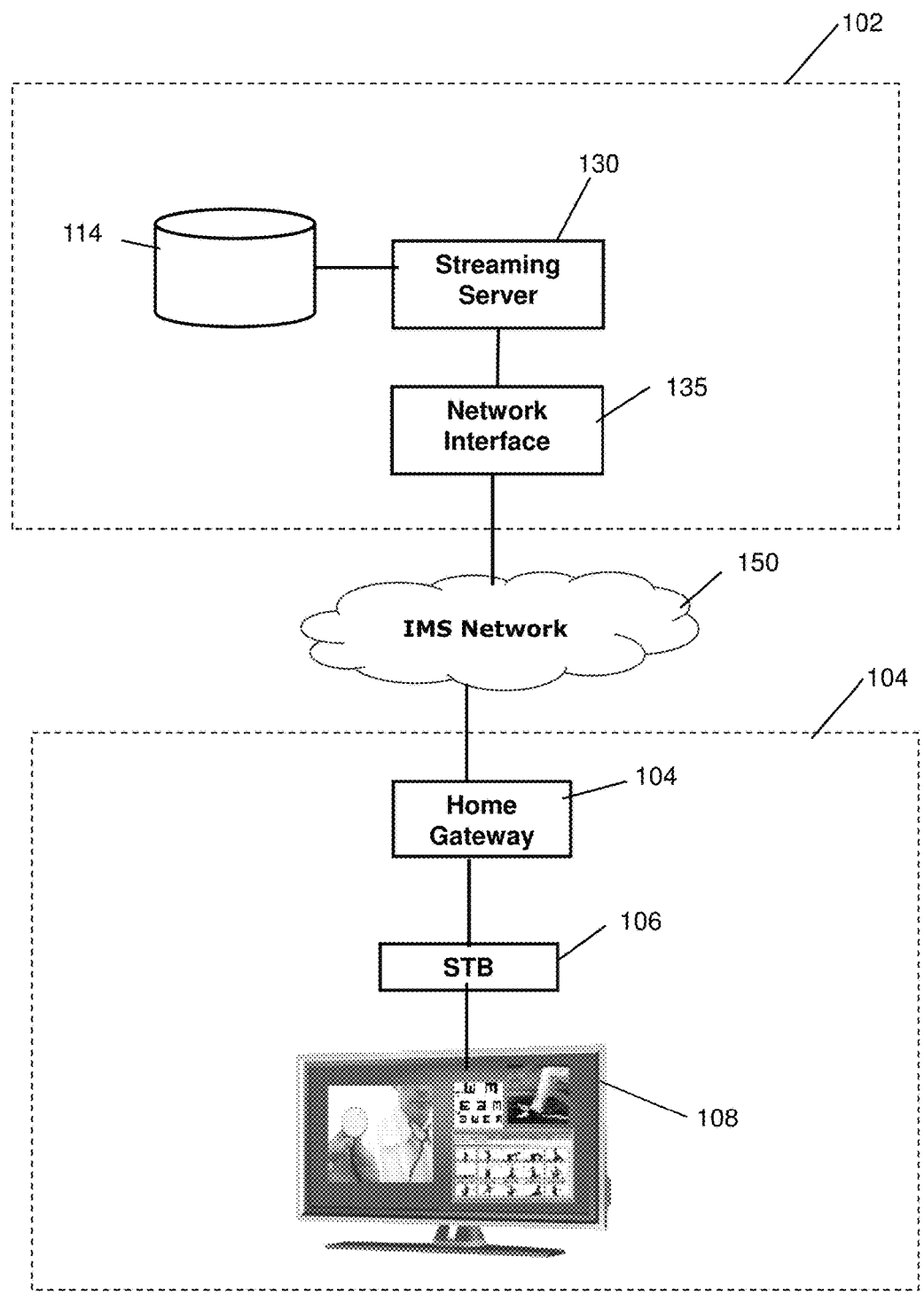
FIG. 1 depicts illustrative embodiments of a system for providing communication services for consumers in a communication system.

The subject disclosure describes, among other things, illustrative embodiments for providing redundancy for video data, including uncompressed video data, for streaming on communication networks. Other embodiments are described in the subject disclosure.

One or more aspects of the subject disclosure include a method and system for providing a data stream with video data for use by a multimedia device. Video content can be received at a server device in the form of data frame data. Each data frame can be divided into data segments according to an information dispersal algorithm. The data segments can be copied and distributed to across other data frames as additional data that can be used as a source of redundant data for the data frame. The combination of data frames and data segments can be transmitted to the multimedia device as a data stream. If an event, such a switch protection event, occurs during the transmission of the data stream and causes data representing a data frame to become corrupted, then the multimedia receiver can access the data segment information for that data frame as that information has been distributed across other data frame locations within the data stream. The multimedia device can use these distributed data segment data to reconstruct the corrupted data frame.

In one or more aspects of the subject disclosure, the amount of data stream overhead that is associated with the redundant data segments can be limited so as to retain efficient use of bandwidth over the communication network path. A limitation for the redundancy overhead can be a known or determinable characteristic of error or loss of data for the communication network path, such a switch protection interval. The method can use a known switch protection interval to determine a maximum predicted loss of data associated with a switch protection event. This predicted loss can be used as a worst case for sizing the level of redundancy that is included into the data stream. The communication network path can be a deterministic path or a non-deterministic path. Characteristics of error or loss of data can be more reliably and accurately known or determined for deterministic networks. Therefore, the application of the method of streaming video data with redundancy can better limit overhead for redundancy for a deterministic network.

One embodiment of the subject disclosure includes a method including receiving, by a system comprising processor, uncompressed video comprising a plurality of data frames. The method can also include determining, by the system, a switch protection interval for a deterministic network path. The method can further include, for every data frame of a plurality of data frames, generating, by the system, a plurality of data segments from data representative of the data frame to create redundancy for the data frame in the plurality of data segments. The plurality of data segments can be sufficient to enable a multimedia receiver to reconstruct the data frame upon a corruption of a subset of the plurality of data segments. The method can include distributing, by the system, a plurality of copies of the plurality of data segments among the plurality of data frames to generate a plurality of redundancy-enhanced data frames, which are sufficiently distributed across the plurality of data frames to provide the redundancy over the switch protection interval. The method can also include transmitting, by the system, a data stream comprising the plurality of redundancy-enhanced data frames to the multimedia receiver via the deterministic network path.

One embodiment of the subject disclosure includes a device including a memory to store executable instructions and a processor. The executable instructions, responsive to being executed by the processor, can facilitate performance of operations including receiving video content comprising a plurality of data frames. The operations can also include, for every data frame of the plurality of data frames, dividing the data frame into a plurality of data segments. The operations can further include appending a plurality of copies of the plurality of data segments to the plurality of data frames in a data stream to generate a plurality of redundancy-enhanced data frames, which provide redundancy for the data frame within the plurality of data frames in the data stream. The plurality of copies can be distributed across the plurality of data frames to provide the redundancy over a switching protection interval associated with a network path. The operations can further include transmitting the data stream comprising the plurality of redundancy-enhanced data frames to a multimedia receiver via the network path.

One embodiment of the subject disclosure includes a machine-readable storage device, including executable instructions which, responsive to being executed by a processor, facilitate performance of operations including, for every data frame of a plurality of data frames of video content, dividing the data frame into a plurality of data segments and, in turn, copying a plurality of each of the plurality of data segments to the plurality of data frames in a data stream to provide redundancy for the data frame within the plurality of data frames in the data stream. The plurality of each of the plurality of data segments is distributed across the plurality of data frames to provide generate a plurality of redundancy-enhanced data frames that provide the redundancy over a protection interval associated with a network path. The operations can further include transmitting a data stream comprising the plurality of redundancy-enhanced data frames to a receiver via the network path.

One or more of the exemplary embodiments can include one or more components or steps described in U.S. patent application, Ser. No. 13/860,927, filed Apr. 11, 2013, entitled, "Redundant Data Dispersal in Transmission of Video Data Based on Frame Type," which is a Continuation of U.S. patent application, Ser. No. 13/563,937 filed Aug. 1, 2012, and now issued as U.S. Pat. No. 8,442,115, entitled "Redundant Data Dispersal in Transmission of Video Data Based on Frame Type," which is a Continuation of U.S. patent application, Ser. No. 11/958,537, filed Dec. 18, 2007, and now issued as U.S. Pat. No. 8,265,154, entitled "Redundant Data Dispersal in Transmission of Video Data Based on Frame Type", where all sections of the aforementioned patents and applications are incorporated herein by reference in their entirety.

FIG. 1 depicts an illustrative embodiment of a system 100 that can be utilized for experiencing multiple media content programming. In one or more embodiments, the system 100 can include a communication network 150. The system 100 can include a subscription telecommunication service, such as an Internet Protocol Multimedia Subsystem (IMS) network 150 for providing cellular/mobile communications, Internet access, and content to mobile communication devices 116 via a mobility network of mobile base stations 117. The system can include a subscription content service, such as an Internet Protocol Television (IPTV) network for providing media content to subscribers. The IPTV network can be part of a cable, satellite, or DSL based media content delivery system. The media content can be any type of viewable content, such as broadcast television, cable or premium television, video on demand, or pay-per-view television. The IPTV network can deliver media content to media processing devices 106 and media display devices 108 at subscriber locations via gateway devices 104.

In one or more embodiments, the system 100 can include one or more servers 130 that are associated with the network, or network, 150. In one embodiment, a streaming server 130 can communicate with media processor devices 106 and mobile communication devices 116 over the network 150. The media server 130 can receive media content from a media source 114. The streaming server 130 can communicate with the network 150 via a network interface 135. The media processor devices 106 can receive media content originating from the streaming server 130 over the network 150.

In one or more embodiments, a media processor device 106 can communicate with a streaming server 130 via the IMS Network 150 by way of a gateway device 104. The media processor device 106 can receive user inputs from a remote control device for performing functions, such as powering ON/OFF, selecting channels for viewing media programs, adjusting volume, and/or programming a digital video recorder. The media processor device 106 can receive a user input for selecting a media program and/or a channel for receiving a media program. In one example, the media processor device 106 can present an electronic programming guide at a media device 108 for assisting in the selection of media programming.

In one or more embodiment, the streaming server 130 can receive media content from one or more media sources 114. The media content can represent broadcast programming, video-on-demand (VoD) programming, commercial content, and the like. In one embodiment, the media content can be uncompressed video or video and audio content. That is, the video or video and audio content that is made available to the streaming server 130 can be in a form that is not compressed using, for example an encoding algorithm such as the motion picture experts group (MPEG) standard for encoding video data, which typically includes a level of compression. For example, the MPEG standard can use several types of video frames (I. P, and B) to encode video information into a file and/or stream of data. In the process of encoding video frame data under this strategy, the MPEG standard can perform a compression of the starting video data that requires less overall storage capacity and/or transport bandwidth. By comparison, uncompressed video data can maintain video framing data in a homogenous format with no attempt to remove video information that could be deemed redundant, from a visual standpoint, and that could be removed via a systematic encoding architecture. Uncompressed video and/or audio content can typically be of higher resolution than MPEG compressed data and can maintain resolution across image types. However, the higher resolution of uncompressed data can carry disadvantages such as a need for greater storage capacity and/or processing or transport bandwidth.

In one embodiment, copies of media content can be made available to the streaming server 130 in various resolutions that are compatible with differing standards for standard television, high definition television, and/or ultra-high definition television. The streaming server 130 can provide media content to many media processor devices 106 over the network 150 via a high definition channel and/or an ultra-high definition channel. The media content can be provided as broadcast television or VoD programming.

Data transmitted via a packet-switched network can be susceptible to packet loss, corruption, and/or excessive latency. Due to timing constraints and the sheer volume of data, data loss or delay in the transmission of encoded video data is particularly problematic. The loss of certain types of video information can result in significant visual artifacts in the presentation at the receiving end. Conventional data recovery techniques adapted for generalized data transmission, such as the use of high quality-of-service (QoS) circuits or the implementation of packet retransmission in accordance with the Telecommunications Communication Protocol (TCP), have the potential to ameliorate the risks of lost video data. However, the implementation of these general mechanisms may not be feasible due to cost or equipment availability. To illustrate, the particular network being used may implement the User Datagram Protocol (UDP), which does not provide a mechanism for the retransmission of lost packets. Further, these conventional data recovery techniques fail to take into account particular characteristics of encoded video data and therefore can inhibit the efficient transmission of the encoded video data.

In one or more embodiments, a viewer's premises 104 can include a network interface or gateway 104, multimedia receiver 106, and a display device 108. The multimedia receiver 106 can include, for example, a set top box (STB) device, a digital network radio receiver, a portable multimedia device (e.g., a multimedia-enable cellular telephone or a digital radio receiver), and the like. In the context of a relatively fixed multimedia receiver, a viewer's premises can include, for example, a residence or place of work of the viewer, a car, a boat, a plane or other vehicle, and the like. In the context of a portable multimedia receiver, such as a multimedia-enabled cellular phone, a viewer's premises can include the viewer's personal space while operating the multimedia receiver. The display device 108 can include, for example, a television or a monitor.

In one or more embodiments, the network 106 can include any of a variety of digital networks or a combination thereof. Examples of the network 106 can include an Internet-Protocol (IP)-based network, such as the Internet, an Ethernet network, a wireless network (e.g., an IEEE 802.11 alb/gin-compatible network), a satellite network, a Bluetooth™-based network, and the like. The transmission medium of the network 106 for wire-based implementations can include, for example, a coaxial cable-based medium (e.g., a cable television medium), a digital subscriber line (DSL)-based medium (e.g., a plain old telephone system (POTS) medium), a fiber-optic medium, and the like.

In one or more embodiments, a network content source 108, in one embodiment, includes a data store 114 (e.g., a memory, a hard drive, etc.) to store encoded video data representative of one or more multimedia programs, a streaming server 130 to access the data store 114 and to process encoded video data to be transmitted into sets of data segments, and a network interface 118 to provide the resulting data segments as the payloads of corresponding sets of network packets for transmission to the viewer's premises 104 via the network 106. The data segments can be transmitted as streaming, uncompressed video data.

In one or more embodiments, the viewer premises 104 can include a multimedia receiver 106, which, in turn, can be coupled to a gateway or a network interface 104 to receive streaming data and/or network packets from the network 150. The multimedia processor 106 can include a data processing module to process the data in the payloads of the received streaming data and/or network packets to reassemble the received video data, and to store the video data output from the data processing module. The multimedia receiver 106 further includes a video processing module to retrieve stored video data from the data store and to present the video data for display on the display device 108.

In one or more embodiments, the network interfaces 135 and 104 can include any of a variety of network interfaces suitable for the network 150, such wireless network interfaces, wired Ethernet interfaces, and the like. The display device 108 and the multimedia processor 106 can include any of a variety of interfaces, such as a digital video interface (DVI), a high-definition multimedia receiver (HDMI), an S-video interface, a composite video interface (e.g., a coaxial cable interface), a component video interface, and the like. The display interface further can include an audio interface for providing audio signaling to the display device 108.

In one or more embodiments, the streaming server 130 and the multimedia receiver 106 can be implemented as software, hardware, firmware, or combinations thereof. For example, in one embodiment one or both of the streaming server 130 or the multimedia receiver 106 can include a storage element (e.g., a memory or a hard disk—not shown) to store a program of instructions and a processor (not shown), whereby the program of instructions is executable by the processor to manipulate the processor so as to perform the techniques described herein with respect to the respective data processing module. As another example, one or both of the streaming server 130 and the multimedia receiver 106, alternately, can be implemented as a hardware state machine (as part of, or separate from, the corresponding network interface) to implement the techniques described herein.

In one or more embodiments, a viewer at the viewer's premises 104 can initiate a presentation of a multimedia program by inputting a request for the multimedia program (e.g., by selecting a particular channel via a remote control) to the multimedia receiver 106. In response, the multimedia receiver 106 transmits a request for the multimedia program to the service provider 102 via the network 106. At the network content source 108 of the service provider 102, the streaming server 130 can access video data representative of the requested multimedia program and prepares the video data for transmission via the network interface 135. In one embodiment, the video data can be stored or received in uncompressed form and the streaming server 139 can prepare the video data for transmission. As part of preparing the video data for transmission, the streaming server 130 can perform a redundancy process wherein the video data can be segmented, on frame-by-frame basis, into many data segments according to a redundancy algorithm. The streaming server 130 can distribute copies of the video data segments across a number of instances of video frame data to generate redundancy-enhanced video frames. In essence, each video frame in the redundancy-enhanced video frames can include data segment information that is derived from segments of other video frames. If corruption is subsequently detected for any data frame that is received at the media processor 106 from the streaming server 130, then distributed data segments can be collected from the data stream and used to reconstruct the vide data. Meanwhile, the corrupted video data can be discarded. The streaming data, including video frames and redundant data segments, can be transmitted over the network 150, where these can be received at the multimedia device 104. In one embodiment, the network interface 135 can encapsulate each data segment into a separate network packet and provides the resulting network packets for transmission to the multimedia receiver 106 via the network 106.

In one of more embodiments, the streaming server 130 can transmit a data stream of uncompressed video data, including the redundancy-enhanced video frames, using a deterministic network link of the network 150. For example, the deterministic network link can be an L1 (physical layer) or L2 (protocol or data link layer) communication link. In one example, the uncompressed video data can be transmitted from the streaming server 130 to the multimedia receiver 106 via a dedicated Ethernet link. In various embodiments, the video data can be segmented into packets or can be transmitted as a continuous data stream. By selecting a deterministic path rather than a non-deterministic path, such as multicasting data packets, the method can achieve predictable delivery conditions, including latency, switching protection latency, and data losses. The predictability of a deterministic data path is offset by the fact that the built-in redundancies of multicasting and/or dual-piping are lost. However, by incorporating redundancy into at the video segment level, the predictability of corruption conditions for the deterministic path can be leveraged to generate a high level of redundancy and robustness with minimal impact on efficiency.

In one or more embodiments, the streaming server 130 can apply a redundancy mechanism to uncompressed video data so as to permit recovery of video data at the multimedia receiver 106 in the event of data loss, data corruption, or excessive transmission latency. However, the application of the redundancy mechanism to the video data for a multimedia program could result in a significant, and perhaps prohibitive, increase in the processing bandwidth necessary to implement the redundancy mechanism and/or in the network bandwidth necessary to transmit the resulting data with redundancy information built in. To avoid this potential problem, the streaming server 130 can selectively add redundancy to a level sufficient to overcome the known and anticipated maximum loss, corruption, and/or transmission latency for the deterministic delivery path. For example, if the deterministic data path is capable of 10 gigabit Ethernet (10 GE), and the data path (or pipe) is carrying uncompressed video at 70% of capacity (7 Gigabit), then a switch to protection event with an interval of 100 millisecond would lead to a predicted, maximum data loss during the switch to protection event of would be 0.7 GB of the transmitted video data. Therefore, fully 10% of data would be lost during the switch to protection event. Calculated another way, if full motion uncompressed video is being carried by the deterministic data path at 30 frames/second, then this same switch to protection interval would cause a loss of 3 frames of the 30 frames/second.

With a deterministic transmission path, the switching protection loss can be accurately assessed. Further, the redundancy of data segments for the streaming data can be "right sized" to cover the worst case of losing 10% of the data while avoiding the inefficient inclusion of greater amounts of redundancy that can slow down performance of the system 100 while gaining no advantage in worst case performance. Further, in one embodiment, an information dispersal algorithm can apply 10% redundancy to each video frame to address the worst case, 10% data loss scenario. Note, however, that if there are great discrepancies between latencies on transmission paths, the switch to protection interval must account for added resynchronization time when moving from a short to a long path.

In one or more embodiments, any of a variety of redundancy mechanisms can be used to redundantly distribute the data of a frame among a set of data segments. To illustrate, the redundancy mechanism can include a software-based or hardware-based implementation of the Information Dispersal Algorithm (IDA) described by Michael O. Rabin in "Efficient Dispersal of Information for Security, Load Balancing, and Fault Tolerance," Journal of the Association of Computing Machinery, Vol. 36, No. 2, April 1989, pp. 335-348, the entirety of which is incorporated by reference herein. As described in the referenced paper, the IDA transforms a file F (the data of a frame in this case) into n pieces (or data segments) via a matrix product of a sequence of vectors to corresponding portions to the file F such that m pieces (m<n) suffice for reconstructing the file F via the inverse of the segmentation operation. The number m of pieces (data segments) necessary to recover the entire file F (data of a frame) can be adjusted as appropriate through manipulation of the algorithm, but with the tradeoff that the total data size of the n generated pieces (data segments) is equal to $(n/m)*$IFI, where IFI represents the total size of the file F (the data of the frame). Thus, as the number m decreases, the total data size of the resulting set of data segments increases, and vice versa. The balance between bandwidth efficiency and data recovery therefore can be set on an implementation-by-implementation basis. Although the IDA is one example of a redundancy mechanism that can be advantageously used, those skilled in the art can use other redundancy mechanisms to distribute data of certain frames redundantly among a set of data segments without departing from the scope of the present disclosure. To illustrate, a forward error correction (FEC)-based technique instead can be used as a redundancy mechanism, as can the broadcast of multiple redundant data streams, whereby a complete data stream can be constructed at the receiving end by switching between the multiple redundant data streams as appropriate using a switch or a router.

In one or more embodiments, at the receiving end, the multimedia receiver 106 can receive a data stream having the video data, which can be in packetized form, including the data segments for the frames of the requested video stream. The network interface 120 can extract the data segments and provides them to a data processing module. The data processing module can reconstruct the frames of the requested multimedia program from the extracted data segments. In the event that one or more data segments for a frame are lost, corrupted, or not timely received, and are not able to be retransmitted in a timely manner, the multimedia receiver 106 can determine whether the data segments of the frame were processed at the transmitting end to incorporate redundancy. If not, the multimedia receiver 106 can initiate an error-handling process to handle the corrupted frame. This error-handling process can include storing the remaining data as a corrupted frame in a data store, filling in the missing data with a default value and storing the resulting frame in the data store, or discarding the entire frame. In these situations, the subsequent processing may introduce a visual artifact in the resulting display frame.

In one or more embodiments, if the data segments were processed to incorporate redundancy, the multimedia processor 106 can use the received data segments to recover the missing data and store the resulting frame in a data store. Moreover, in at least one embodiment, assembly of the frame from data segments with redundancy information can be initiated once a sufficient number of data segments have been received so as to permit recovery of the data in the other data segments that have yet to be received. Thus, once a minimum number of data segments for a frame has been received, processing of the frame can be initiated without having to wait for the remainder of the data segments to arrive at the receiving end. In the event that too few data segments are available to recover the missing data, an error-handling process may need to be initiated for the corrupted frame. However, in the event that the distribution of data of a frame with redundancy is performed only for those frames that affect the decoding of multiple frames, the inability to fully recover such a frame may introduce a severe visual artifact in the presentation of the video content.

Figure 2A:
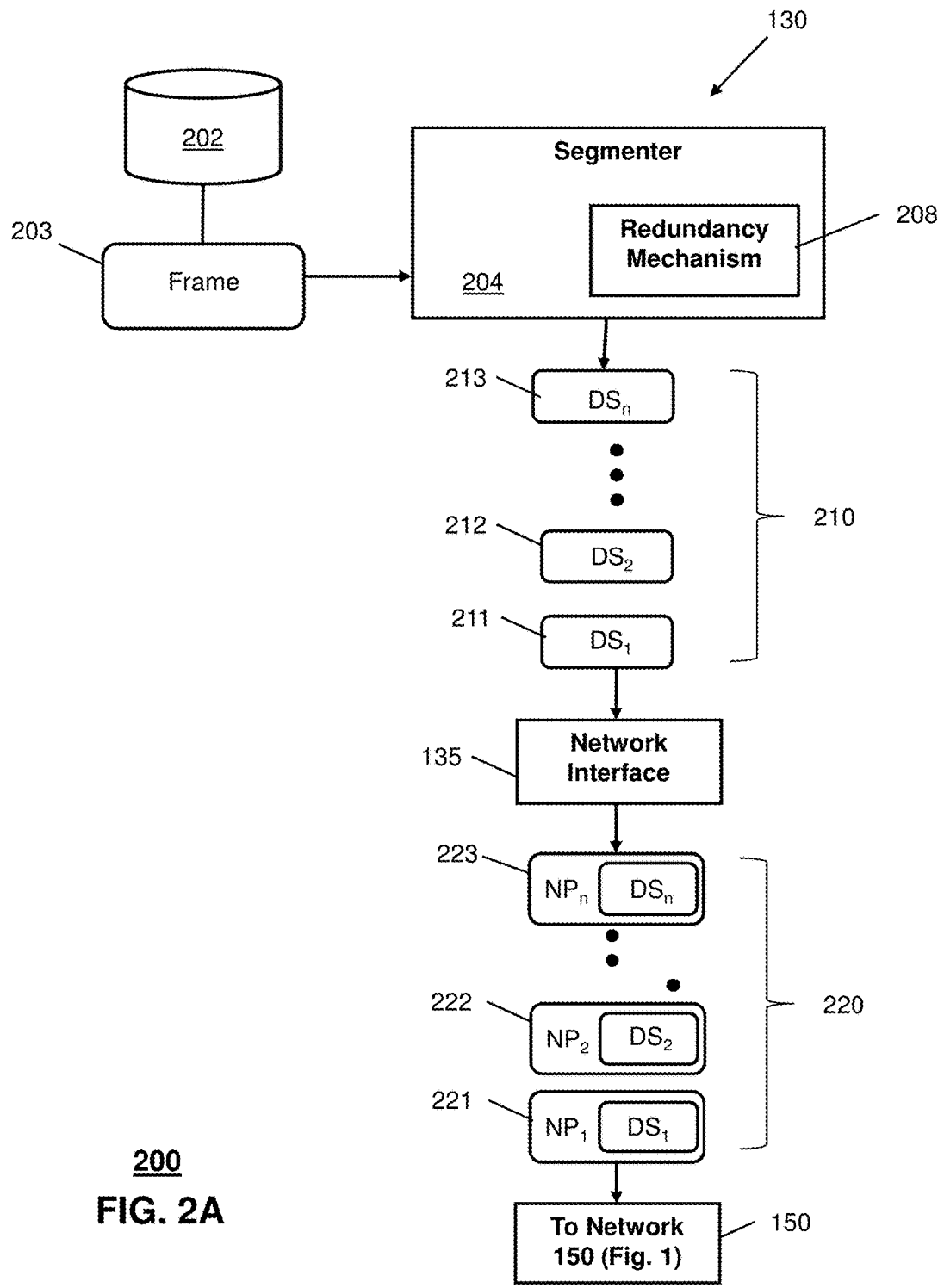
FIG. 2A depicts illustrative embodiments of a streaming server of the communication system of FIG. 1.

FIG. 2A depicts illustrative embodiments of a streaming server 130 of the communication system of FIG. 1. In one or more embodiments, the streaming server 130 can include a buffer 202 (e.g., the data store 114 of FIG. 1 or a different data store), a segmenter module 204, and a redundancy mechanism module 208. The segmenter module 204 and the redundancy mechanism module 208 can be implemented as software, hardware, firmware, or combinations thereof.

In one or more embodiments, the segmenter module 204 can be configured to operate on uncompressed video data being processed for transmission on a frame-by-frame basis. The segmenter module 204 can access data representative of at least a portion of a frame 203 for processing. The segmenter module 204 can apply the redundancy mechanism 208 in segmenting the data of the frame 203 such that the information represented by the frame is redundantly distributed among the set 210 of data segments such that a subset of at least a certain number of the set 210 can be used to recover data lost by the loss, corruption, or excessive delay of other data segments of the set 210. Moreover, the redundant distribution of information throughout the set 210 of data segments permits the receiving end to reconstruct the frame once a sufficient subset of data segments has been received without having to wait for receipt of all of the data segments.

It will be appreciated that the redundant distribution of data of the frame 203 among the set 210 typically increases the overall data size of the set 210 such that the total data size of the set 210 is greater than the total data size of the frame 203, whereas the segmentation of the frame 203 without redundancy will result in the set 210 having a total data size approximately equal to the total data size of the frame 203. Thus, by limiting the distribution of copies of the redundant data such that the overall amount of redundancy is sufficient to deal with the known switch protection interval, the appreciable impact on the processing and transmission efficiency and reliable transmission of video content is minimized.

In one or more embodiments, the network interface 135 can receive the data segments of the set 210 and, optionally, packetize each data segment into a different network packet of a corresponding set 220 of network packets NP1, NP2, . . . , NPn (illustrated as network packets 221-223). Any of a variety of packet formats can be implemented based on the protocol of the network 150 (FIG. 1). To illustrate, the network 150 may support the Real-Time Transport Protocol (RTP), which provides end-to-end network transport functions for applications transmitting real-time data, such as audio and video data, over multicast or unicast network services. In this case, the network packets of the set 220 can comprise RTP formatted packets (which in turn encapsulate UDP packets). Alternatively, data segments can be transmitted as unpacketized data using, for example, HDMI.

In one or more embodiments, the network interface 135 can provide the packetized set 220 or the unpacketized set 210 to the network 150 for transmission to the multimedia receiver 106 via a deterministic network path. In one or more embodiments, where one or more of the data segments from the set 220 may be lost, corrupted, or excessively delayed as they navigate the nodes of the network 106. In instances where the data segments of the frame 203 are generated without redundancy, the loss, corruption, or excessive delay of one of the network packets typically will result in an unrecoverable error in reforming the frame 203 at the receiving end. However, in instances where the data segments of the frame 203 are generated with redundancy, the receiving end typically would be able to recover lost data using the redundancy built into the remaining data segments that were received at the receiving end.

Figure 2B:
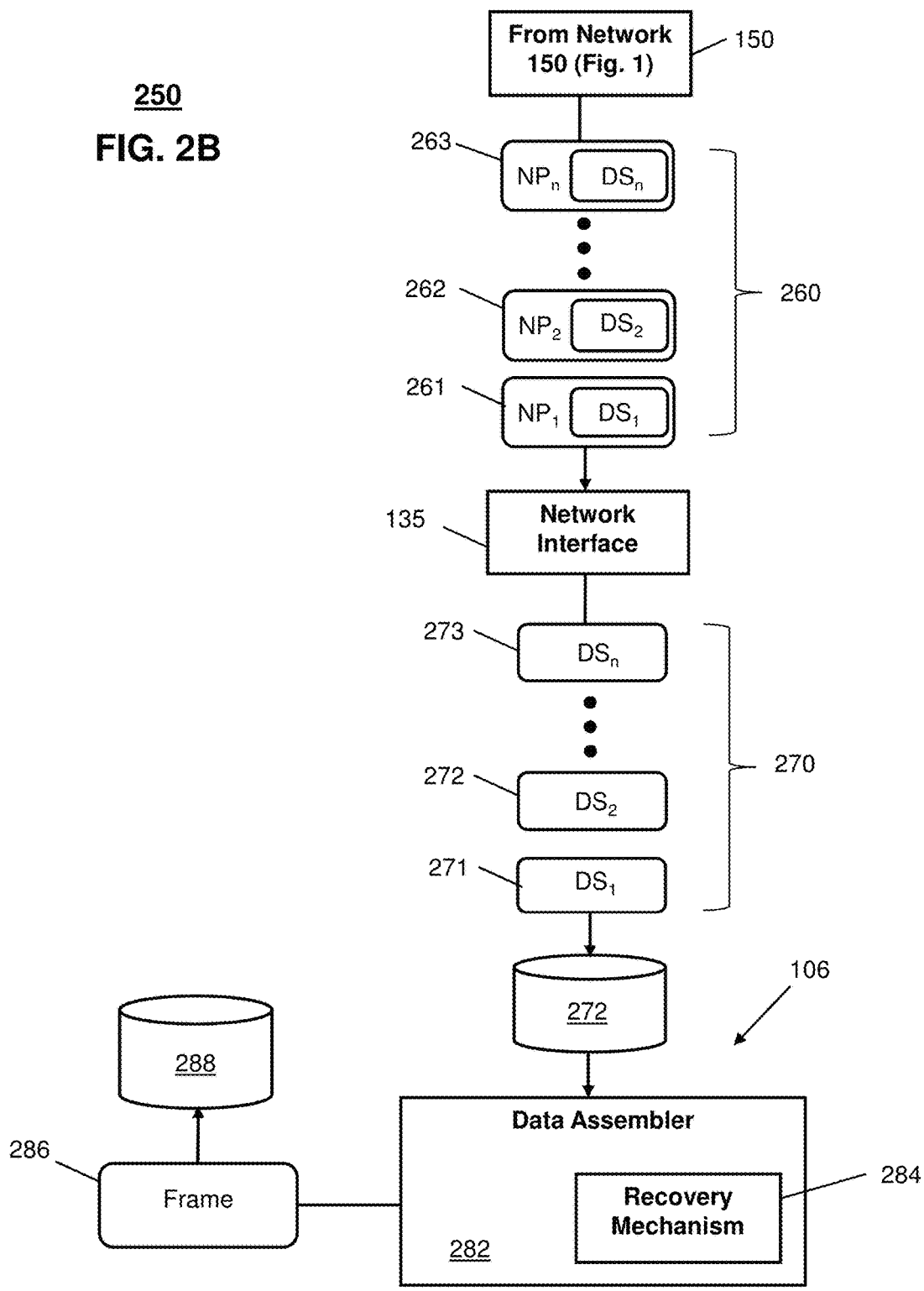
FIG. 2B depicts illustrative embodiments of a multimedia receiver of the communication system of FIG. 1.

FIG. 2B depicts illustrative embodiments of a multimedia receiver of the communication system of FIG. 1. In one or more embodiments, the multimedia receiver 106 includes a first buffer 272, a second buffer 288, and an assembler module 282. The assembler module 404 can be implemented as software, hardware, firmware, or combinations thereof. In one or more embodiments, the network interface 135 can receive a set 260 of network packets NP1, NP2, . . . , NPn (illustrated as network packets 261-263), each having a data segment representative of information of a frame 286 of encoded video data. The set 260 can correspond to, for example, the set 220 of network packets of FIG. 2A, with the exception that one or more network packets may have been lost, corrupted, or excessively delayed during their transmission via the network 150. Alternately, the set 260 can represent a subset of data segments with redundant information that is sufficient to reconstruct the entire frame using the redundant information without having to wait for receipt of the remaining data segments. The network interface 135 can extract the data segments of the received network packets to generate a set 270 of data segments DS1, DS2, . . . , DSn (illustrated as data segments 271-273) representative of the frame 286. The set 270 can be stored in the first buffer 272.

In one or more embodiments, due to packet loss, corruption or delay, or due to the desire to expedite processing of the frame, the set 270 may represent only a subset of the set 220 (FIG. 2A) of data segments generated from the corresponding frame. Accordingly, when accessing the set 270 from the buffer 272 to generate the corresponding frame 286, the assembler module 282 can recognize that the redundancy mechanism 208 was applied to the data of the video frame in generating the corresponding set of data segments and thus the assembler module 282 uses a recovery mechanism 284 to generate the data of the frame 286 from the set 270 of data segments (where the recovery mechanism reverses the redundant distribution of data among the set of data segments performed by application of the recovery mechanism 284 of FIG. 2B). In the event of data loss (i.e., the set 270 is not the complete set of data segments), the assembler module 282 can use the recovery mechanism 284 to recover the lost data using the built-in redundancy in the remaining data segments. Otherwise, if all data is present, the assembler module 282 can use the recovery mechanism 284 to extract the data of the frame 286 from the data of the set 270 of data segments and provide the data of the frame 286 to the second buffer 288 for storage.

Figure 3:
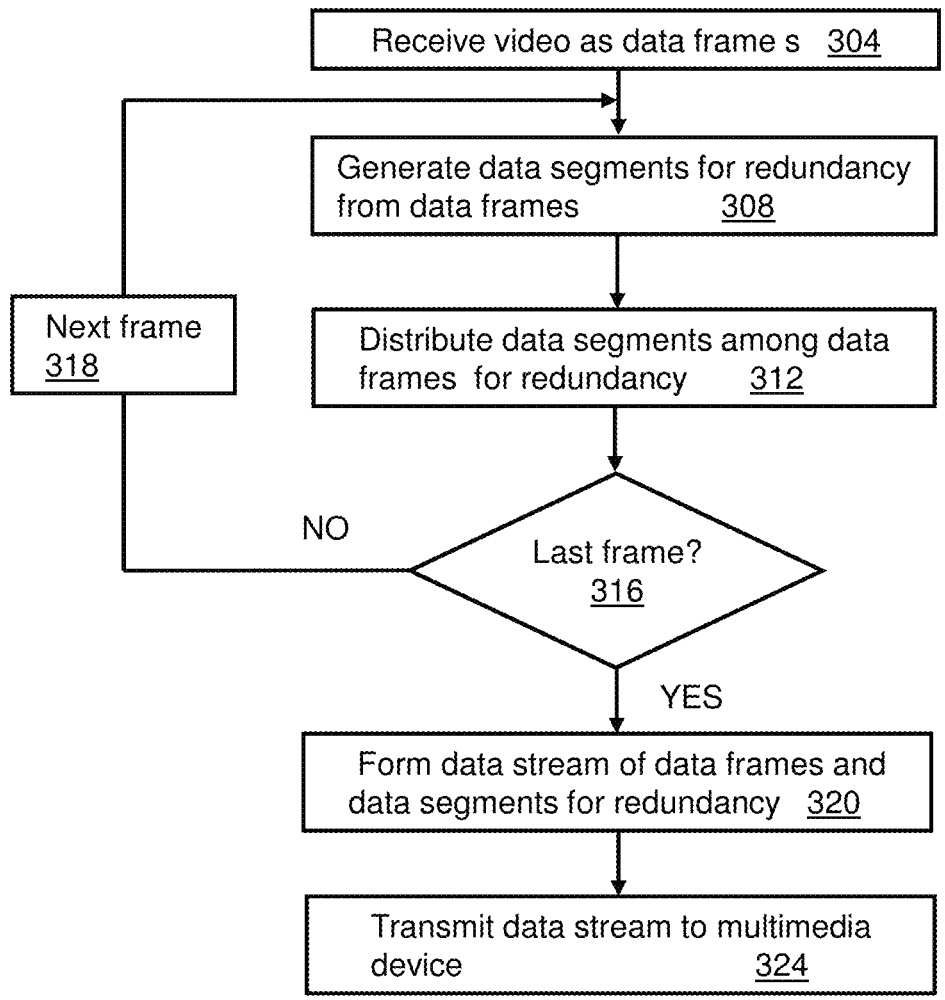
FIG. 3 depicts illustrative embodiments of a method for employing a redundancy mechanism for video content transmission used in portions of the system described in FIGS. 1, 2A, and 2B.

FIG. 3 depicts illustrative embodiments of a method for employing a redundancy mechanism for video content transmission used in portions of the system described in FIGS. 1, 2A, and 2B. At step 304, the streaming server 130 receives video data as data frames. At step 308, each data frame can be divided into data segments according to an information dispersal algorithm. At step 312 data segments can be copied and distributed to across other data frames as additional data that can be used as a source of redundant data for the data frame. At steps 316 and 318, the processes of generating data segments and distributing data segments for redundancy can be repeated until all of the data frames are processed. At steps 320 and 324, the combination of data frames and data segments can be used to form a data stream, which can be transmitted to the multimedia device.

Figure 4:
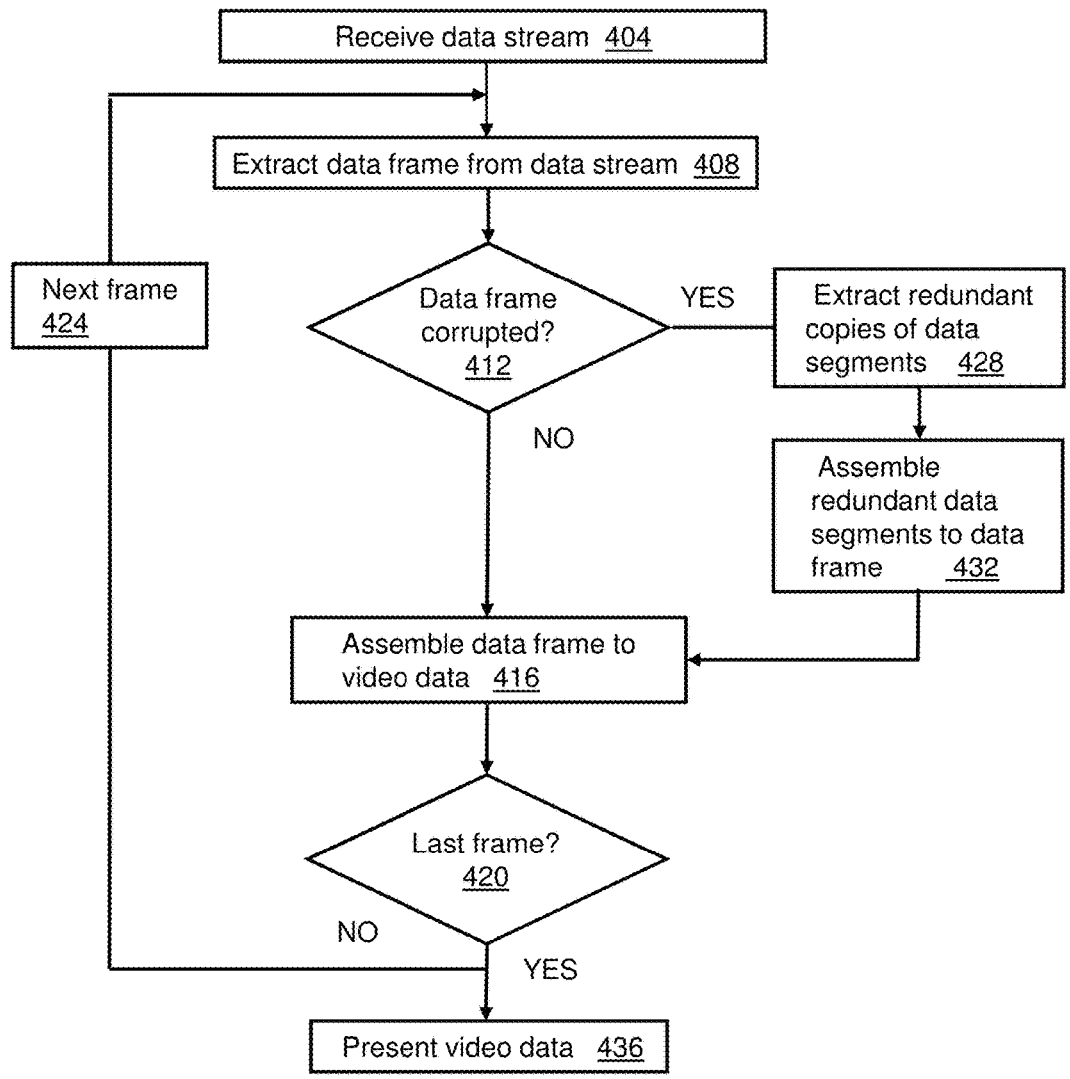
FIG. 4 depicts illustrative embodiments of a method for employing a redundancy mechanism for receiving video content in portions of the system described in FIGS. 1, 2A, and 2B.

FIG. 4 depicts illustrative embodiments of a method for employing a redundancy mechanism for receiving video content in portions of the system described in FIGS. 1, 2A, and 2B. At step 404, a multimedia device can receive the data stream from the streaming server. At step 408, the multimedia device can extract a data frame from the data stream. At step 412, if the data representing the data frame has become corrupted, then the multimedia receiver can access the data segment information for that data frame as that information has been distributed across other data frame locations within the data stream in step 428. The multimedia device can use these distributed data segment data to reconstruct the corrupted data frame at step 432. At step 416, the multimedia device can assemble the data frame, whether not corrupted or corrupted but corrected, to the video data. This process is repeated for every frame until all the frames have been completed as directed by steps 420 and 424. The assembled video data can be presented at step 436.

Figure 5:
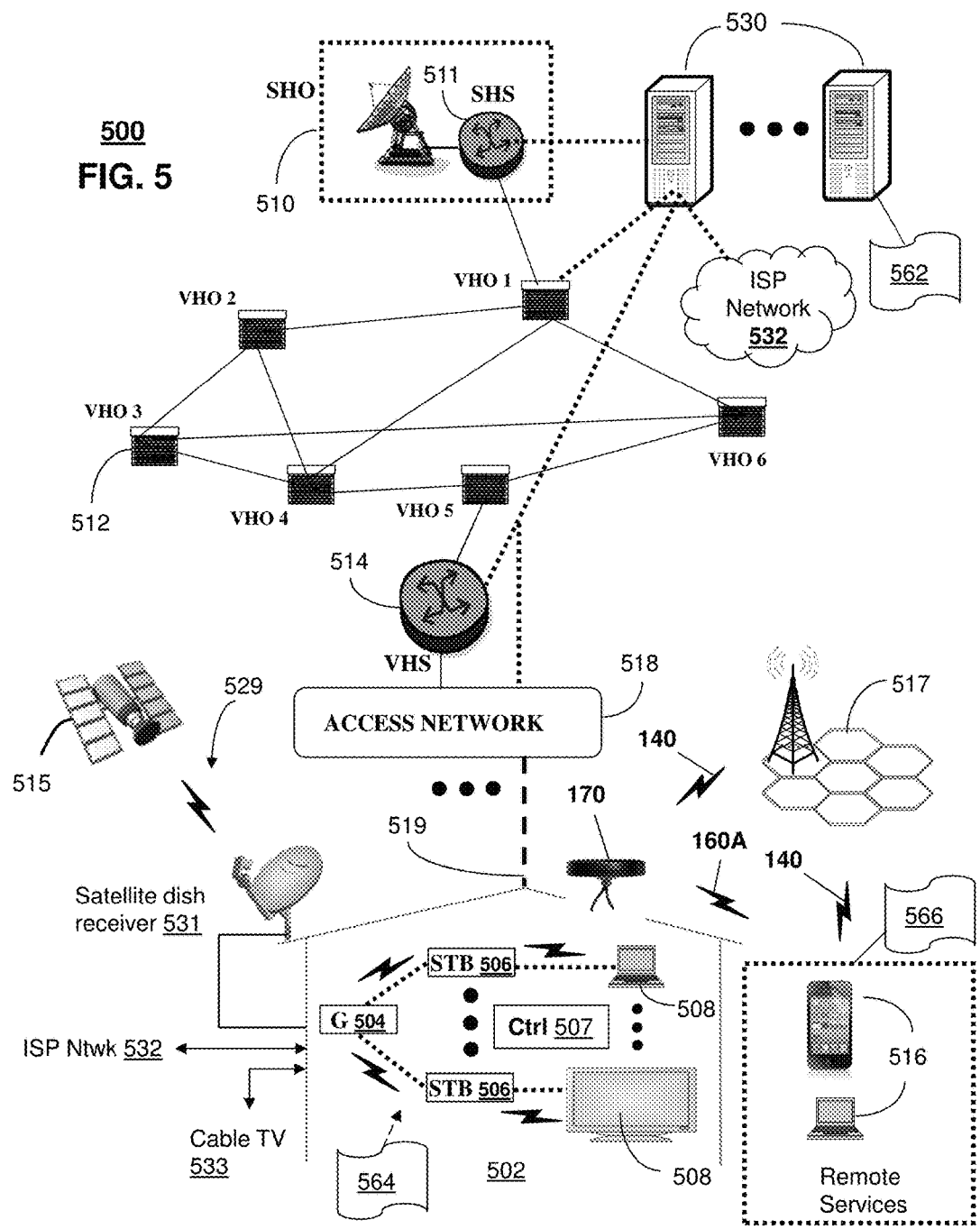
FIGS. 5-6 depict illustrative embodiments of communication systems that provide communication and media services for communication devices according to embodiments illustrated in FIGS. 1, 2, and 4-5.

FIG. 5 depicts an illustrative embodiment of a first communication system 500 for delivering media content. The communication system 500 can represent an Internet Protocol Television (IPTV) media system. Communication system 500 can be overlaid or operably coupled with system 100 of FIGS. 1, 2A, and 2B as another representative embodiment of communication system 500. For instance, one or more devices illustrated in the communication system 500 of FIG. 5 can be used for providing a data stream with redundancy to a consumer device in a communication network 500. A streaming server 530 can receive video data and can add redundancy to the video data by dividing the video data into data segments. The data segments can be distributed across video data in the stream. The degree to which redundancy is included can be tailored according to a maximum expected data loss or corruption for the network data path that is used for streaming the data to a multimedia device.

The IPTV media system can include a super head-end office (SHO) 510 with at least one super headend office server (SHS) 511 which receives media content from satellite and/or terrestrial communication systems. In the present context, media content can represent, for example, audio content, moving image content such as 2D or 3D videos, video games, virtual reality content, still image content, and combinations thereof. The SHS server 511 can forward packets associated with the media content to one or more video head-end servers (VHS) 514 via a network of video head-end offices (VHO) 512 according to a multicast communication protocol.

The VHS 514 can distribute multimedia broadcast content via an access network 518 to commercial and/or residential buildings 502 housing a gateway 504 (such as a residential or commercial gateway). The access network 518 can represent a group of digital subscriber line access multiplexers (DSLAMs) located in a central office or a service area interface that provide broadband services over fiber optical links or copper twisted pairs 519 to buildings 502. The gateway 504 can use communication technology to distribute broadcast signals to media processors 506 such as Set-Top Boxes (STBs) which in turn present broadcast channels to media devices 508 such as computers or television sets managed in some instances by a media controller 507 (such as an infrared or RF remote controller).

The gateway 504, the media processors 506, and media devices 508 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 506 and subsystems of the IPTV media system for services such as video-on-demand (VoD), browsing an electronic programming guide (EPG), or other infrastructure services.

A satellite broadcast television system 529 can be used in the media system of FIG. 5. The satellite broadcast television system can be overlaid, operably coupled with, or replace the IPTV system as another representative embodiment of communication system 500. In this embodiment, signals transmitted by a satellite 515 that include media content can be received by a satellite dish receiver 531 coupled to the building 502. Modulated signals received by the satellite dish receiver 531 can be transferred to the media processors 506 for demodulating, decoding, encoding, and/or distributing broadcast channels to the media devices 508. The media processors 506 can be equipped with a broadband port to an Internet Service Provider (ISP) network 532 to enable interactive services such as VoD and EPG as described above.

In yet another embodiment, an analog or digital cable broadcast distribution system such as cable TV system 533 can be overlaid, operably coupled with, or replace the IPTV system and/or the satellite TV system as another representative embodiment of communication system 500. In this embodiment, the cable TV system 533 can also provide Internet, telephony, and interactive media services.

The subject disclosure can apply to other present or next generation over-the-air and/or landline media content services system.

Some of the network elements of the IPTV media system can be coupled to one or more computing devices 530, a portion of which can operate as a web server for providing web portal services over the ISP network 532 to wireline media devices 508, and/or wireless communication devices 516. For example, a streaming server 530 can communicate with a multimedia device 106 to configure how the multimedia device 106 handles a data stream with redundancy.

Communication system 500 can also provide for all or a portion of the computing devices 530 to function as a streaming server 530 (herein referred to as server 530). The server 530 can use computing and communication technology to perform function 562, which can include among other things, the redundancy techniques described by method 400 of FIG. 4. For instance, function 562 of server 530 can be similar to the functions described for servers 130 of FIG. 1 in accordance with method 300. The media processors 506 and wireless communication devices 516 can be provisioned with software functions 564 and 566, respectively, to utilize the services of the server 530. For instance, functions 564 and 566 of media processors 506 and wireless communication devices 516 can be similar to the functions described for the multimedia processor 106 of FIG. 1 in accordance with method 400.

Multiple forms of media services can be offered to media devices over landline technologies such as those described above. Additionally, media services can be offered to media devices by way of a wireless access base station 517 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 6:
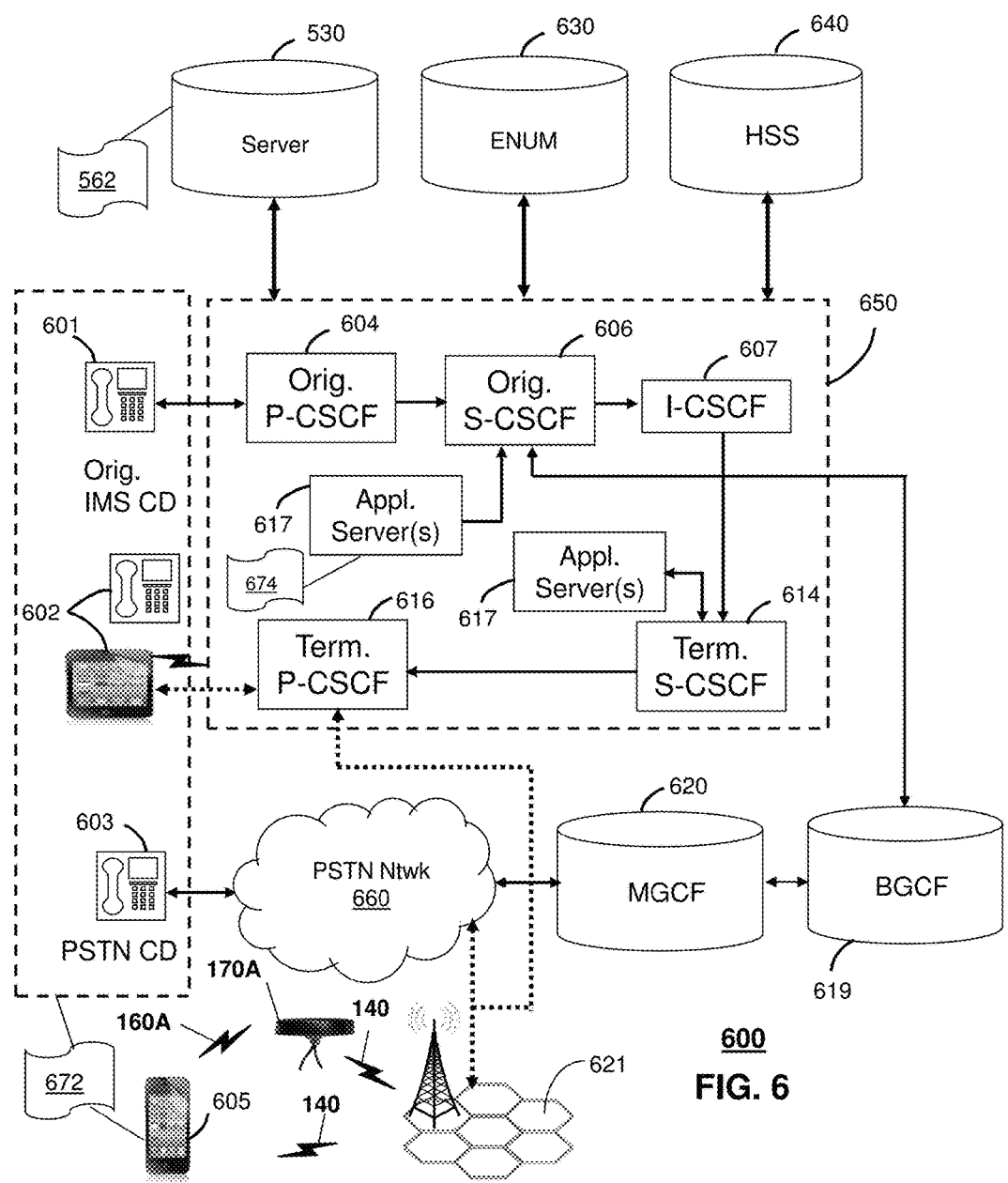

FIG. 6 depicts an illustrative embodiment of a communication system 600 employing an IP Multimedia Subsystem (IMS) network architecture to facilitate the combined services of circuit-switched and packet-switched systems. Communication system 600 can be overlaid or operably coupled with system 100 of FIGS. 1, 2A, and 2B, and communication system 500 as another representative embodiment of communication system 500.

For instance, one or more devices illustrated in the communication system 600 of FIG. 6 can be used for providing a data stream with redundancy to a consumer device in a communication network 650. A streaming server 530 can receive video data and can add redundancy to the video data by dividing the video data into data segments. The data segments can be distributed across video data in the stream. The degree to which redundancy is included can be tailored according to a maximum expected data loss or corruption for the network data path that is used for streaming the data to a multimedia device.

Communication system 600 can comprise a Home Subscriber Server (HSS) 640, a tElephone NUmber Mapping (ENUM) server 630, and other network elements of a network 650. The network 650 can establish communications between IMS-compliant communication devices (CDs) 601, 602, Public Switched Telephone Network (PSTN) CDs 603, 605, and combinations thereof by way of a Media Gateway Control Function (MGCF) 620 coupled to a PSTN network 660. The MGCF 620 need not be used when a communication session involves IMS CD to IMS CD communications. A communication session involving at least one PSTN CD may utilize the MGCF 620.

IMS CDs 601, 602 can register with the network 650 by contacting a Proxy Call Session Control Function (P-CSCF) which communicates with an interrogating CSCF (I-CSCF), which in turn, communicates with a Serving CSCF (S-CSCF) to register the CDs with the HSS 640. To initiate a communication session between CDs, an originating IMS CD 601 can submit a Session Initiation Protocol (SIP INVITE) message to an originating P-CSCF 604 which communicates with a corresponding originating S-CSCF 606. The originating S-CSCF 606 can submit the SIP INVITE message to one or more application servers (ASs) 617 that can provide a variety of services to IMS subscribers.

For example, the application servers 617 can be used to perform originating call feature treatment functions on the calling party number received by the originating S-CSCF 606 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 606 can submit queries to the ENUM system 630 to translate an E.164 telephone number in the SIP INVITE message to a SIP Uniform Resource Identifier (URI) if the terminating communication device is IMS-compliant. The SIP URI can be used by an Interrogating CSCF (I-CSCF) 607 to submit a query to the HSS 640 to identify a terminating S-CSCF 614 associated with a terminating IMS CD such as reference 602. Once identified, the I-CSCF 607 can submit the SIP INVITE message to the terminating S-CSCF 614. The terminating S-CSCF 614 can then identify a terminating P-CSCF 616 associated with the terminating CD 602. The P-CSCF 616 may then signal the CD 602 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 6 may be interchangeable. It is further noted that communication system 600 can be adapted to support video conferencing. In addition, communication system 600 can be adapted to provide the IMS CDs 601, 602 with the multimedia and Internet services of communication system 600 of FIG. 6.

If the terminating communication device is instead a PSTN CD such as CD 603 or CD 605 (in instances where the cellular phone only supports circuit-switched voice communications), the ENUM system 630 can respond with an unsuccessful address resolution which can cause the originating S-CSCF 606 to forward the call to the MGCF 620 via a Breakout Gateway Control Function (BGCF) 619. The MGCF 620 can then initiate the call to the terminating PSTN CD over the PSTN network 660 to enable the calling and called parties to engage in voice and/or data communications.

It is further appreciated that the CDs of FIG. 6 can operate as wireline or wireless devices. For example, the CDs of FIG. 6 can be communicatively coupled to a cellular base station 621, a femtocell, a WiFi router, a Digital Enhanced Cordless Telecommunications (DECT) base unit, or another suitable wireless access unit to establish communications with the network 650 of FIG. 6. The cellular access base station 621 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 6.

Cellular phones supporting LTE can support packet-switched voice and packet-switched data communications and thus may operate as IMS-compliant mobile devices. In this embodiment, the cellular base station 621 may communicate directly with the network 650 as shown by the arrow connecting the cellular base station 621 and the P-CSCF 616.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

A streaming server 530 of FIG. 5 can be operably coupled to communication system 600 for purposes similar to those described above. The streaming server 530 can perform function 562 and thereby provide communication signal streaming services to the CDs 601, 602, 603 and 605 of FIG. 5 similar to the functions described for server 530 of FIG. 6 in accordance with method 400 of FIG. 4. CDs 601, 602, 603 and 605, which can be adapted with software to perform function 562 to utilize the services of the streaming server 530 similar to the functions described for communication devices 516 of FIG. 5 in accordance with method 400 of FIG. 4. The streaming server 530 can be an integral part of the application server(s) 617 performing function 674, which can be substantially similar to function 562 and adapted to the operations of the network 650.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 7:
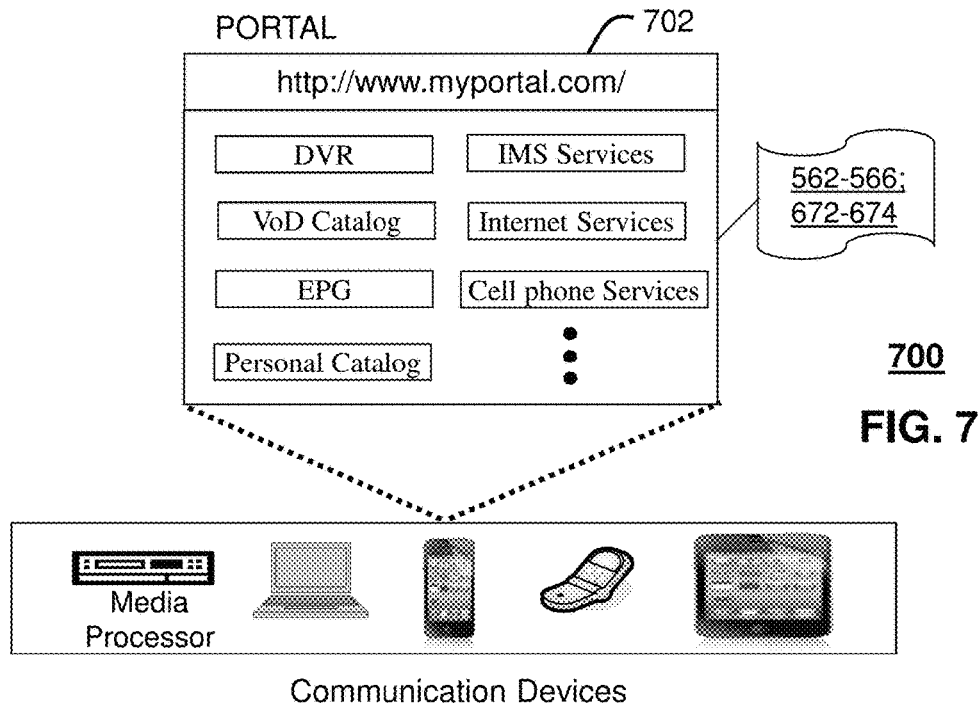
FIG. 7 depicts an illustrative embodiment of a web portal for interacting with the communication systems of FIGS. 1, 2, and 4-5.

FIG. 7 depicts an illustrative embodiment of a web portal 702 of a communication system 700. Communication system 700 can be overlaid or operably coupled with systems 100 of FIGS. 1, 2A, 2B, and 3, communication system 500, and/or communication system 600 as another representative embodiment of systems 100 of FIGS. 1, 2A, 2B, and 3, communication system 500, and/or communication system 600. The web portal 702 can be used for managing services of communication system 100 of FIGS. 1, 2A, 2B, and 3, and communication systems 500-600. A web page of the web portal 702 can be accessed by a Uniform Resource Locator (URL) with an Internet browser using an Internet-capable communication device such as those described in FIGS. 1, 2A, 2B, and 3, and FIGS. 4-5. The web portal 702 can be configured, for example, to access a media processor 506 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 506. The web portal 702 can also be used for provisioning IMS services described earlier, provisioning Internet services, provisioning cellular phone services, and so on.

The web portal 702 can further be utilized to manage and provision software applications 562-566, and 672-674 to adapt these applications as may be desired by subscribers and/or service providers of system 100 of FIGS. 1, 2A, 2B, and 3, and communication systems 500-600. For instance, users of the services provided by a streaming server 530 or server 530 can log into their on-line accounts and communicate with a streaming server 530, which can communicate with a streaming server 130 to configure how the streaming server 130 provides a data stream with redundancy to a consumer device in a communication network 500. A streaming server 530 can receive video data and can add redundancy to the video data by dividing the video data into data segments. The data segments can be distributed across video data in the stream. The degree to which redundancy is included can be tailored according to a maximum expected data loss or corruption for the network data path that is used for streaming the data to a multimedia device. Service providers can log onto an administrator account to provision, monitor and/or maintain the system 100 of FIGS. 1, 2A, 2B, and 3 and/or server 530 of FIGS. 5 and 6.

Figure 8:
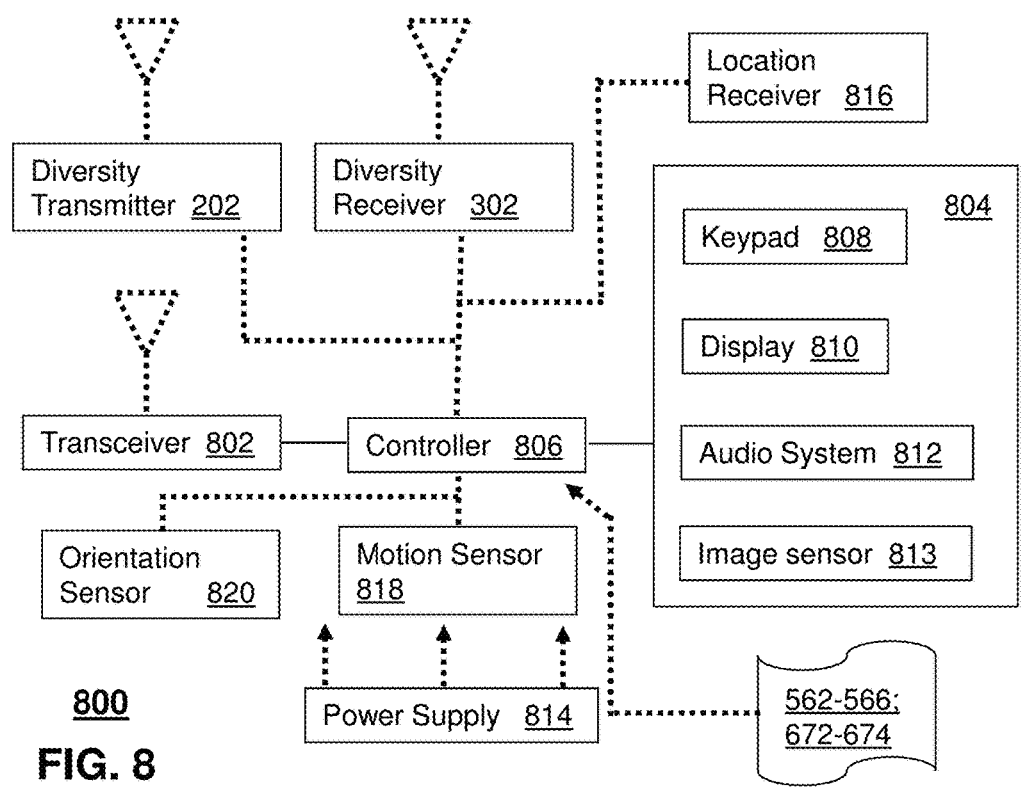
FIG. 8 depicts an illustrative embodiment of a communication device.

FIG. 8 depicts an illustrative embodiment of a communication device 800. Communication device 800 can serve in whole or in part as an illustrative embodiment of the devices depicted in FIGS. 1, 2A, 2B, 3, and FIGS. 4-5. Communication device 800 in whole or in part can represent any of the communication devices described in FIGS. 1, 2A, 2B, 3, and 4-5 and can be configured to perform portions of method 400 of FIG. 4.

Communication device 800 can comprise a wireline and/or wireless transceiver 802 (herein transceiver 802), a user interface (UI) 804, a power supply 814, a location receiver 816, a motion sensor 818, an orientation sensor 820, and a controller 806 for managing operations thereof. The transceiver 802 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 802 can also be adapted to support circuit-switched wireline access technologies (such as PSTN), packet-switched wireline access technologies (such as TCP/IP, VoIP, etc.), and combinations thereof.

The UI 804 can include a depressible or touch-sensitive keypad 808 with a navigation mechanism such as a roller ball, a joystick, a mouse, or a navigation disk for manipulating operations of the communication device 800. The keypad 808 can be an integral part of a housing assembly of the communication device 800 or an independent device operably coupled thereto by a tethered wireline interface (such as a USB cable) or a wireless interface supporting for example Bluetooth®. The keypad 808 can represent a numeric keypad commonly used by phones, and/or a QWERTY keypad with alphanumeric keys. The UI 804 can further include a display 810 such as monochrome or color LCD (Liquid Crystal Display), OLED (Organic Light Emitting Diode) or other suitable display technology for conveying images to an end user of the communication device 800. In an embodiment where the display 810 is touch-sensitive, a portion or all of the keypad 808 can be presented by way of the display 810 with navigation features.

The display 810 can use touch screen technology to also serve as a user interface for detecting user input. As a touch screen display, the communication device 800 can be adapted to present a user interface with graphical user interface (GUI) elements that can be selected by a user with a touch of a finger. The touch screen display 810 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 810 can be an integral part of the housing assembly of the communication device 800 or an independent device communicatively coupled thereto by a tethered wireline interface (such as a cable) or a wireless interface.

The UI 804 can also include an audio system 812 that utilizes audio technology for conveying low volume audio (such as audio heard in proximity of a human ear) and high volume audio (such as speakerphone for hands free operation). The audio system 812 can further include a microphone for receiving audible signals of an end user. The audio system 812 can also be used for voice recognition applications. The UI 804 can further include an image sensor 813 such as a charged coupled device (CCD) camera for capturing still or moving images.

The power supply 814 can utilize common power management technologies such as replaceable and rechargeable batteries, supply regulation technologies, and/or charging system technologies for supplying energy to the components of the communication device 800 to facilitate long-range or short-range portable applications. Alternatively, or in combination, the charging system can utilize external power sources such as DC power supplied over a physical interface such as a USB port or other suitable tethering technologies.

The location receiver 816 can utilize location technology such as a global positioning system (GPS) receiver capable of assisted GPS for identifying a location of the communication device 800 based on signals generated by a constellation of GPS satellites, which can be used for facilitating location services such as navigation. The motion sensor 818 can utilize motion sensing technology such as an accelerometer, a gyroscope, or other suitable motion sensing technology to detect motion of the communication device 800 in three-dimensional space. The orientation sensor 820 can utilize orientation sensing technology such as a magnetometer to detect the orientation of the communication device 800 (north, south, west, and east, as well as combined orientations in degrees, minutes, or other suitable orientation metrics).

The communication device 800 can use the transceiver 802 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 806 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 800.

Other components not shown in FIG. 8 can be used in one or more embodiments of the subject disclosure. For instance, the communication device 800 can include a reset button (not shown). The reset button can be used to reset the controller 806 of the communication device 800. In yet another embodiment, the communication device 800 can also include a factory default setting button positioned, for example, below a small hole in a housing assembly of the communication device 800 to force the communication device 800 to re-establish factory settings. In this embodiment, a user can use a protruding object such as a pen or paper clip tip to reach into the hole and depress the default setting button. The communication device 800 can also include a slot for adding or removing an identity module such as a Subscriber Identity Module (SIM) card. SIM cards can be used for identifying subscriber services, executing programs, storing subscriber data, and so forth.

The communication device 800 as described herein can operate with more or less of the circuit components shown in FIG. 8. These variant embodiments can be used in one or more embodiments of the subject disclosure.

The communication device 800 can be adapted to perform the functions of devices of FIGS. 1, 2A, 2B, and 3, the media processor 506, the media devices 508, or the portable communication devices 516 of FIG. 5, as well as the IMS CDs 601-602 and PSTN CDs 603-605 of FIG. 6. It will be appreciated that the communication device 800 can also represent other devices that can operate in systems of FIGS. 1, 2A, 2B, and/or 3, communication systems 500-600 of FIGS. 5-6 such as a gaming console and a media player.

The communication device 800 shown in FIG. 8 or portions thereof can serve as a representation of one or more of the devices of system of FIGS. 1, 2A, 2B, and 3, communication system 500, and communication system 600. In addition, the controller 806 can be adapted in various embodiments to perform the functions 562-566 and 672-674, respectively.

For instance, the communication device 800 of FIG. 8 can be used for providing a data stream with redundancy to a consumer device in a communication network 500. A streaming server 530 can receive video data and can add redundancy to the video data by dividing the video data into data segments. The data segments can be distributed across video data in the stream. The degree to which redundancy is included can be tailored according to a maximum expected data loss or corruption for the network data path that is used for streaming the data to a multimedia device.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 9:
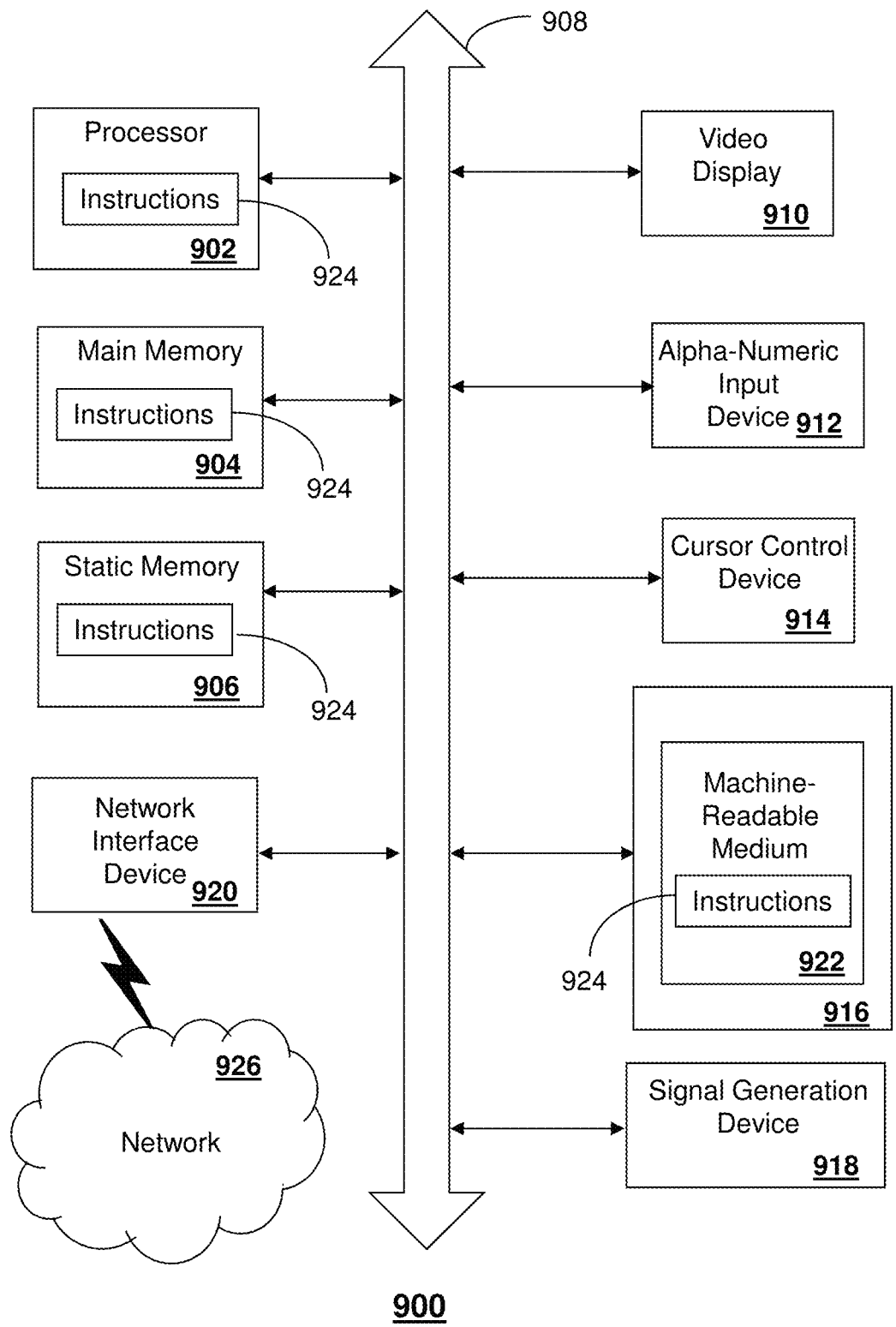
FIG. 9 is a diagrammatic representation of a machine in the form of a computer system within which a set of instructions, when executed, may cause the machine to perform any one or more of the methods described herein.

FIG. 9 depicts an exemplary diagrammatic representation of a machine in the form of a computer system 900 within which a set of instructions, when executed, may cause the machine to perform any one or more of the methods described above. One or more instances of the machine can be used for providing a data stream with redundancy to a consumer device in a communication network 500. A streaming server 530 can receive video data and can add redundancy to the video data by dividing the video data into data segments. The data segments can be distributed across video data in the stream. The degree to which redundancy is included can be tailored according to a maximum expected data loss or corruption for the network data path that is used for streaming the data to a multimedia device.

In some embodiments, the machine may be connected (e.g., using a network 926) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine"

shall also be taken to include any collection of machines that individually or jointly execute a set (or multiple sets) of instructions to perform any one or more of the methods discussed herein.

The computer system 900 may include a processor (or controller) 902 (e.g., a central processing unit (CPU)), a graphics processing unit (GPU, or both), a main memory 904 and a static memory 906, which communicate with each other via a bus 908. The computer system 900 may further include a display unit 910 (e.g., a liquid crystal display (LCD), a flat panel, or a solid state display). The computer system 900 may include an input device 912 (e.g., a keyboard), a cursor control device 914 (e.g., a mouse), a disk drive unit 916, a signal generation device 918 (e.g., a speaker or remote control) and a network interface device 920. In distributed environments, the embodiments described in the subject disclosure can be adapted to utilize multiple display units 910 controlled by two or more computer systems 900. In this configuration, presentations described by the subject disclosure may in part be shown in a first of the display units 910, while the remaining portion is presented in a second of the display units 910.

The disk drive unit 916 may include a tangible computer-readable storage medium 922 on which is stored one or more sets of instructions (e.g., software 924) embodying any one or more of the methods or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 922 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 900.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   receiving, by a processing system including a processor, video content comprising a plurality of data frames;
   dividing, by the processing system, a data frame of the plurality of data frames into a plurality of data segments according to an information dispersal algorithm that is configured according to a condition of a network path, wherein the network path comprises a deterministic path, and wherein the deterministic path comprises a maximum potential data loss corresponding to a switch-to-protection interval;
   generating and distributing, according to the information dispersal algorithm, by the processing system, a plurality of copies of the plurality of data segments across the plurality of data frames in a data stream to generate a plurality of redundancy-enhanced data frames, wherein the plurality of redundancy-enhanced data frames provides sufficient redundancy to cover the maximum potential data loss corresponding to the switch-to-protection interval; and
   transmitting, by the processing system, the data stream of the video content comprising the plurality of redundancy-enhanced data frames to a receiver via the network path.

2. The method of claim 1, further comprising determining, by the processing system, the switch-to-protection interval for the deterministic path.

3. The method of claim 1, wherein the dividing and generating and distributing is performed on each frame of the plurality of data frames.

4. The method of claim 1, further comprising determining, by the processing system, the condition of the network path.

5. The method of claim 1, wherein the plurality of data segments are from data representative of the data frame.

6. The method of claim 1, wherein the plurality of data segments create redundancy for the data frame in the plurality of data segments.

7. The method of claim 1, wherein the plurality of data segments is sufficient to enable the receiver to reconstruct the data frame upon a corruption of a subset of the plurality of data segments.

8. The method of claim 1, wherein the information dispersal algorithm transforms the data frame into the plurality of data segments via a matrix product of a sequence of vectors corresponding to the data frame.

9. The method of claim 1, wherein the condition comprises one of a bandwidth limitation, a switching protection event, a switching latency, or any combination thereof.

10. The method of claim 1, wherein the receiver extracts a first subset of the plurality of data frames from the plurality of redundancy-enhanced data frames of the data stream that are received and determines a corruption of the first subset of the plurality of data frames based on an error checking algorithm.

11. The method of claim 10, wherein the receiver extracts a second subset of the plurality of data frames from the plurality of copies of the plurality of data segments that are distributed in the plurality of redundancy-enhanced data frames responsive to detecting the corruption of the first subset of the plurality of data frames.

12. The method of claim 1, further comprising transmitting, by the processing system, the data stream to a network interface device to enable the network interface device to convert the data stream into a plurality of network packets for transmission over a data network.

13. A device comprising:
a memory to store executable instructions; and
a processing system including a processor communicatively coupled to the memory, wherein the executable instructions, responsive to being executed by the processing system, facilitate performance of operations comprising:
- receiving, via a network path, a data stream of video content comprising a plurality of redundancy-enhanced data frames generated according to an information dispersal algorithm, wherein the network path comprises a deterministic path, and wherein the deterministic path comprises a maximum potential data loss corresponding to a switch-to-protection interval;
- extracting a first subset of a plurality of data frames from the plurality of redundancy-enhanced data frames of the data stream;
- detecting a corruption of the first subset of the plurality of data frames based on an error checking algorithm;
- responsive to detecting the corruption of the first subset of the plurality of data frames, extracting a second subset of the plurality of data frames from a plurality of copies of a plurality of data segments that are distributed in the plurality of redundancy-enhanced data frames, wherein the plurality of redundancy-enhanced data frames provides sufficient redundancy to cover the maximum potential data loss corresponding to the switch-to-protection interval; and
- substituting the second subset of the plurality of data segments for the first subset of the plurality of data frames to mitigate the corruption that is detected.

14. The device of claim 13, wherein the plurality of redundancy-enhanced data frames are generated by distributing, according to the information dispersal algorithm, the plurality of copies of the plurality of data segments across the plurality of data frames in the data stream.

15. The device of claim 13, wherein the plurality of redundancy-enhanced data frames are generated by dividing, according to the information dispersal algorithm, a data frame of the plurality of data frames into the plurality of data segments.

16. The device of claim 13, wherein the information dispersal algorithm is configured according to a condition of a network path.

17. A non-transitory machine-readable storage medium, comprising executable instructions that, when executed by a processing system including a processor, facilitate performance of operations, comprising:
- dividing a data frame of a plurality of data frames associated with video content into a plurality of data segments according to an information dispersal algorithm that is configured according to a condition of a network path, wherein the network path comprises a deterministic path, and wherein the deterministic path comprises a maximum potential data loss corresponding to a switch-to-protection interval;
- distributing, according to the information dispersal algorithm, a plurality of copies of the plurality of data segments across the plurality of data frames in a data stream to generate a plurality of redundancy-enhanced data frames, wherein the plurality of redundancy-enhanced data frames provides sufficient redundancy to cover the maximum potential data loss corresponding to the switch-to-protection interval; and
- transmitting the data stream of the video content comprising the plurality of redundancy-enhanced data frames to a receiver via the network path.

18. The non-transitory machine-readable storage medium of claim 17, wherein the operations further comprise determining the switch-to-protection interval for the network path.

19. The non-transitory machine-readable storage medium of claim 17, wherein the receiver extracts a first subset of the plurality of data frames from the plurality of redundancy-enhanced data frames of the data stream that are received and determines a corruption of the first subset of the plurality of data frames based on an error checking algorithm, and wherein the receiver extracts a second subset of the plurality of data frames from the plurality of copies of the plurality of data segments that are distributed in the plurality of redundancy-enhanced data frames responsive to detecting the corruption of the first subset of the plurality of data frames.

* * * * *